(12) United States Patent
Siewiera et al.

(10) Patent No.: US 7,694,999 B2
(45) Date of Patent: Apr. 13, 2010

(54) AIRBAG MODULE (75) Inventors: Thomas Siewiera, Diesen (FR); Felix Massot, Mauquenchy (FR); Gilles Garret, Rouen (FR)

(73) Assignee: Autoliv Development AB, Vargarda (SE)

( * ) Notice: Subject to any disclaimer, the term of this patent is extended or adjusted under 35 U.S.C. 154(b) by 477 days.

(21) Appl. No.: 11/631,882

(22) PCT Filed: Jul. 1, 2005

(86) PCT No.: PCT/EP2005/007115

§ 371 (c)(1),
(2), (4) Date: Jan. 8, 2007

(87) PCT Pub. No.: WO2006/005454

PCT Pub. Date: Jan. 19, 2006

(65) Prior Publication Data
US 2008/0018080 A1 Jan. 24, 2008

(30) Foreign Application Priority Data
Jul. 8, 2004 (DE) ........................ 10 2004 033 295

(51) Int. Cl.
B60R 21/16 (2006.01)
(52) U.S. Cl. ...................... 280/728.2; 24/458
(58) Field of Classification Search ............. 280/728.2, 280/730.2; 411/41, 508, 45–48; 24/297, 24/457, 458
See application file for complete search history.

(56) References Cited

U.S. PATENT DOCUMENTS 4,263,833 A  4/1981  Loudin et al.
6,514,024 B2 *  2/2003  Akema et al. ............... 411/48
6,533,487 B2 *  3/2003  Clark ............................ 403/71
6,726,417 B2 *  4/2004  Kanie ........................... 411/48
7,210,886 B2 *  5/2007  Kawai et al. ............... 411/508
7,273,227 B2 *  9/2007  Kawai et al. ............. 280/730.2
7,523,959 B2 *  4/2009  Kawai et al. ............. 280/730.2
2003/0129040 A1 *  7/2003  Arisaka ....................... 411/41
2004/0136812 A1 *  7/2004  Kawai et al. ................ 411/508
2005/0062263 A1 *  3/2005  Kawai et al. ............. 280/728.2

FOREIGN PATENT DOCUMENTS

EP  1 502 828  2/2005
EP  1 422 112  4/2006
WO  WO 02/28690 A1  4/2002

* cited by examiner

Primary Examiner—Paul N Dickson
Assistant Examiner—Drew Brown
(74) Attorney, Agent, or Firm—Brinks Hofer Gilson & Lione (57) ABSTRACT An airbag module with an airbag and a fastening system for fastening the airbag to the interior structure of a motor vehicle. The fastening system includes at least one connecting element comprising of at least one fastening section for fastening the airbag module and at least one locking section (25b) for locking the connection element into an aperture in the interior structure. To prevent assembly errors, the fastening system furthermore includes a retention element (30), which has an assembly position and a retention position and is arranged to move on the connecting element, wherein the connecting element can be locked to the interior structure only when the retention element is in its assembly position, and wherein the connecting element is fixed to the interior structure when the retention element is in its retention position.

19 Claims, 12 Drawing Sheets

AIRBAG MODULE

CROSS REFERENCE TO RELATED APPLICATIONS

This application claims priority to DE 10 2004 033 295.9 filed Jul. 8, 2004 and PCT/EP2005/007115, filed Jul. 1, 2005.

FIELD OF THE INVENTION

The invention relates to an airbag module with a fastening system for motor vehicle applications.

BACKGROUND OF THE INVENTION

Airbags are known that are fastened to the interior structure of a motor vehicle, for example side curtain airbags are arranged in the vicinity of the roof pillar in the vehicle. In addition to a gas generator and the actual airbag, such an airbag module includes at least one fastening fastener for fastening the airbag module to the vehicle interior structure. In the case of a side curtain airbag, fastening typically occurs along an upper edge of the airbag. Since such curtain airbags are usually relatively long and extend along the sides of the interior, a plurality of fasteners, three for example, are often provided.

The fastening systems mentioned above connect the airbag module to the vehicle interior structure. Accordingly, one such fastening system includes a connecting element comprising of at least a fastening section for fastening the airbag and an assembly section for fastening to the vehicle interior structure. It is known from WO 02/28690 A1 to configure the assembly section as a locking section so that the connecting element can be locked into one or more apertures in the vehicle interior side structure. A screw, which is tightened after the connecting element has locked the locking section into the interior structure, is provided as an additional fastening means. In that design, the locking section primarily serves as an assembly aid and the screw performs the actual fastening. The manufacture and assembly of such an airbag module can be summarized to include the following steps. The manufacturer of the airbag module arranges the connecting elements on the airbag and the folded-up or rolled-up airbag is typically enclosed with a covering. The airbag module is delivered to the vehicle manufacturer in this state and assembled there. Typically, the assembly process is performed by a single assembler, who locks the locking section to the vehicle interior structure and, if provided, tightens the fastening screws. The interior trim panel, in the form of a roofliner for example, is then installed.

The disadvantage in the above described approach is that after the assembly of the interior trim panel, it is no longer possible to conveniently determine whether the airbag module was fastened into the vehicle correctly. An incorrect fastening can arise by forgetting a screw or by an incomplete locking of the locking section. Such a defect could remain unnoticed after assembly of the interior trim panel and can cause the airbag module to improperly operate in the event of an accident.

SUMMARY OF THE INVENTION

In view of the foregoing, it is an objective of this invention to provide an airbag module which prevents defective assembly in the interior structure of the vehicle.

According to the present invention, the fastening system for fastening the airbag module includes, in addition to a connecting element, a retention element which is arranged to move relative to the connecting element. The retention element forms an assembly position and a retention position. To this end, the retention element is configured in such a manner that the connecting element cannot be locked into position when the retention element is in its retention position. To this end, the assembly position is advantageously chosen in such a manner that a fitting arrangement of the interior trim panel is not possible as long as the retention element remains in this position.

If the retention element is moved into its retention position, the connecting element is fixed. During the assembly of the airbag module according to the invention, the locking section is first locked into an aperture of the side structure. This effects a preliminary fixation. After the airbag module has been fixed in the vehicle in such a preliminary manner, the motion of the retention element to its retention position effects the final fastening. A single assembler can easily manage such an assembly even when a plurality of modules are present. To this end, the connecting elements can first be locked one after another and then be fixed by moving the retention elements.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

In the airbag module according to the present invention, the fastening system for fastening the airbag module to the side structure of a motor vehicle interior includes at least two components, namely a connecting element and a retention element fastened thereto. In the exemplary embodiments that are described in more detail below, the retention element is configured as a retention lever swivel-mounted on the connecting element.

Figure 1:
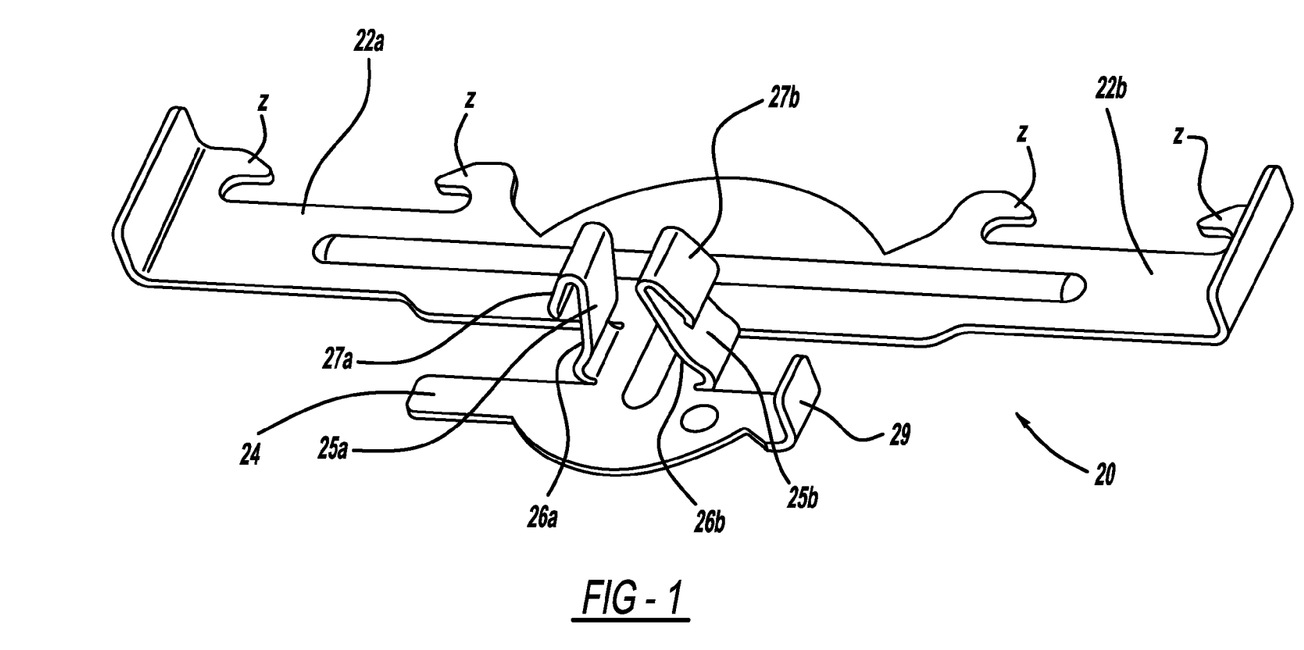
FIG. 1 shows a connecting element of the fastening system of this invention in perspective illustration.
Figure 2:
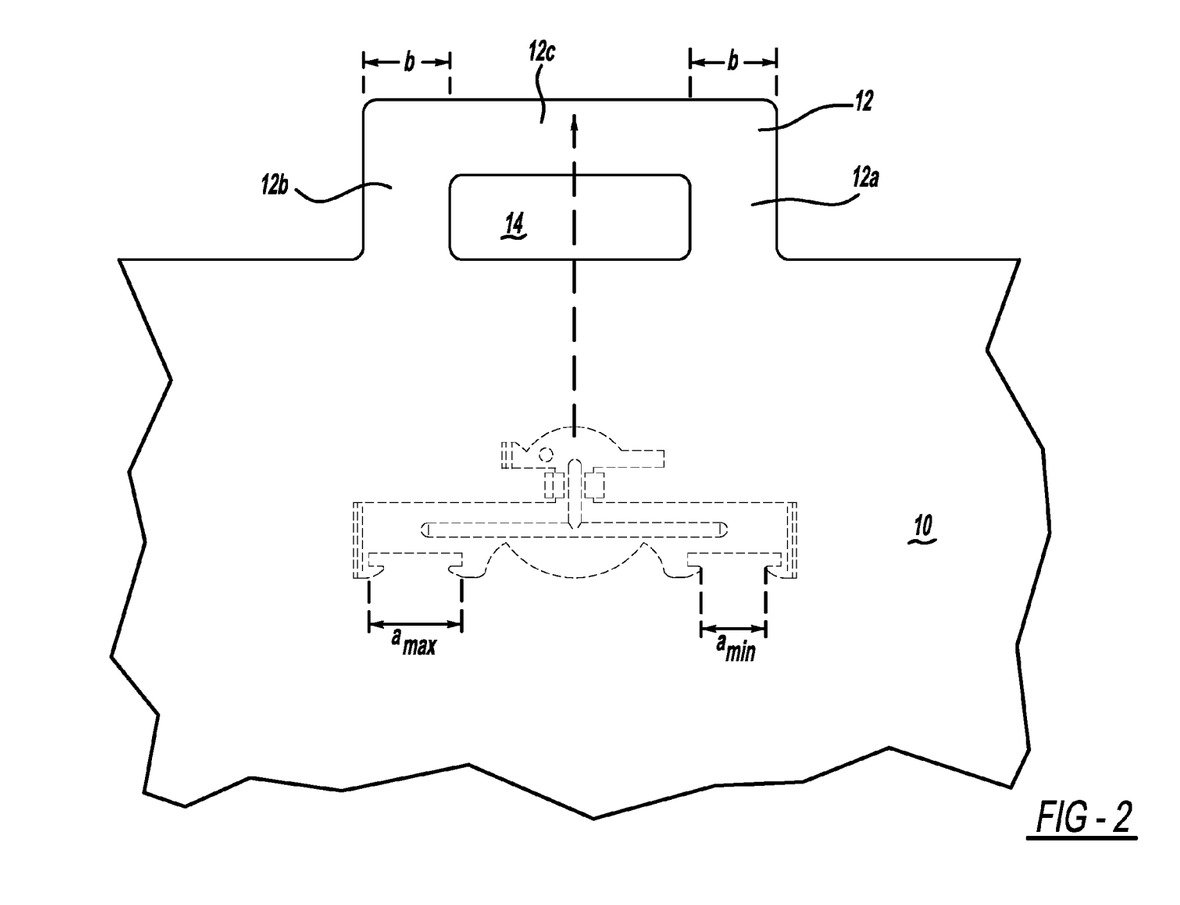
FIG. 2 shows the connecting element from FIG. 1 and an associated airbag with a fastening clip.

FIG. 1 shows an exemplary embodiment of a connecting element 20. Here the connecting element 20 is configured as a bent sheet-metal part of one-piece integral construction. The connecting element 20 forms two functional sections, namely a fastening section to which the airbag is fastened and a locking section for locking to a vehicle interior structure. In the exemplary embodiment shown here, the fastening section forms two pincer-shaped sections 22a and 22b. The two locking sections 25a and 25b each form a first leg 26a and 26b, and a second leg 27a and 27b. The ends of the two second legs 27a and 27b are free. Moreover, the connecting element 20 forms a rotary-protection clip 29, which prevents any rotation of connecting element 20 on the interior structure during and after assembly, and the arm 24, whose function will be described later.

FIGS. 2 to 6 shows the assembly of an airbag 10 on the connecting element 20 and the assembled state. A suitable airbag 10 includes a fastening flap 12 on one edge, the fastening flap having an opening 14. The fastening flap 12 surrounds the opening 14 on three sides, the two side sections 12a and 12b having a width b, which essentially corresponds to the maximum clearance $a_{max}$ of the pincer-shaped sections 22a and 22b (see FIG. 2). To this end, the smallest clearance $a_{min}$ of the pincers Z of sections 22a and 22b is smaller than the width b of the side segments 12a and 12b.

Figure 3:
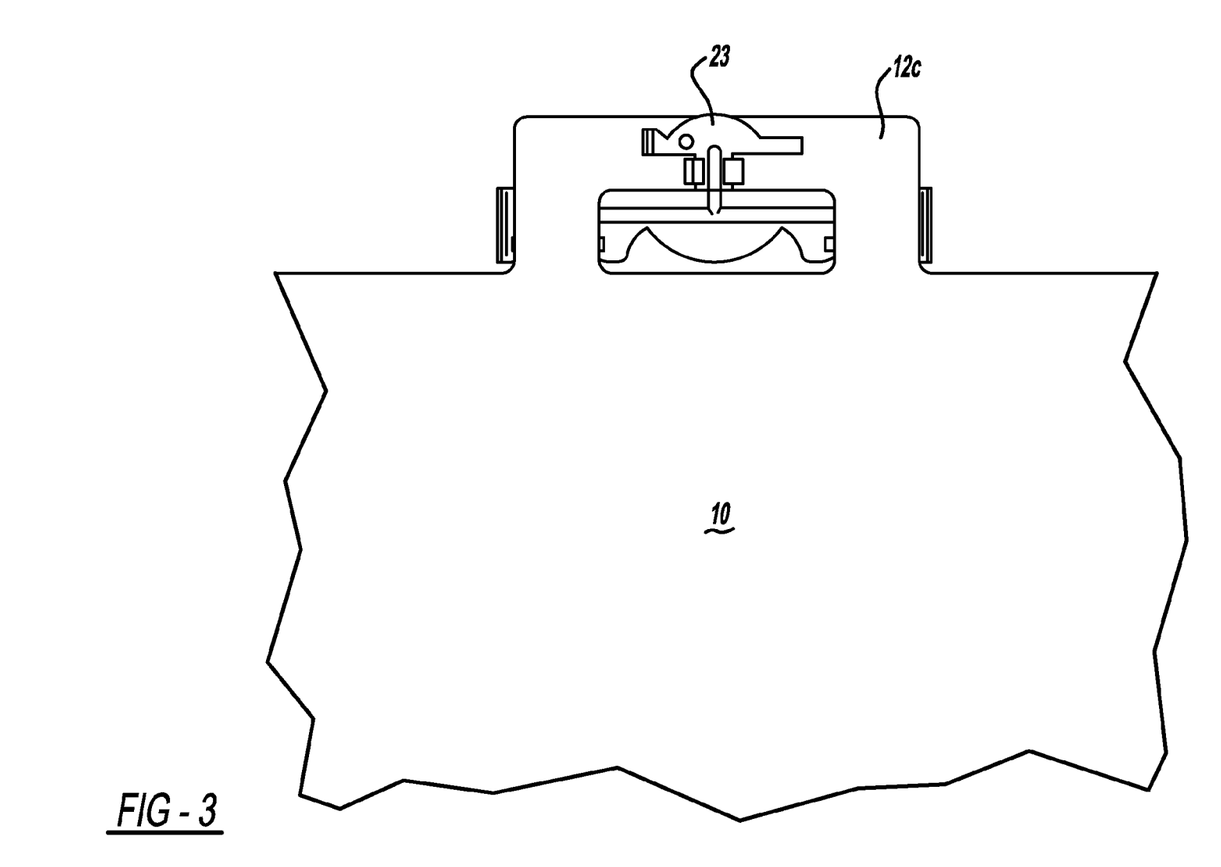
FIG. 3 shows the connecting element and airbag from FIG. 2 while the airbag is being fastened to the connecting element.
Figure 4:
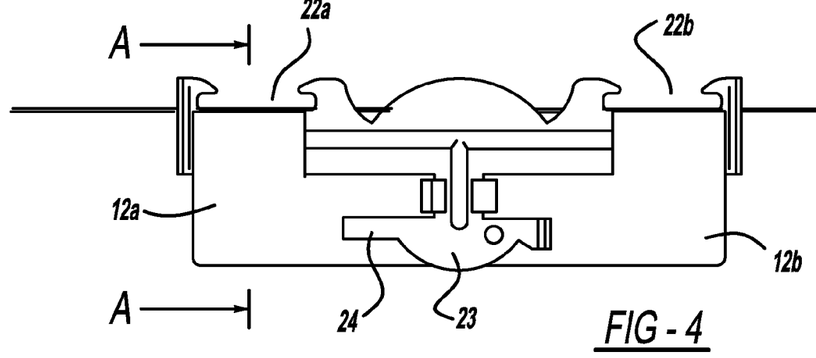
FIG. 4 shows the fastening clip and connecting element from FIG. 3 in a fastened airbag.
Figures 5, 6:
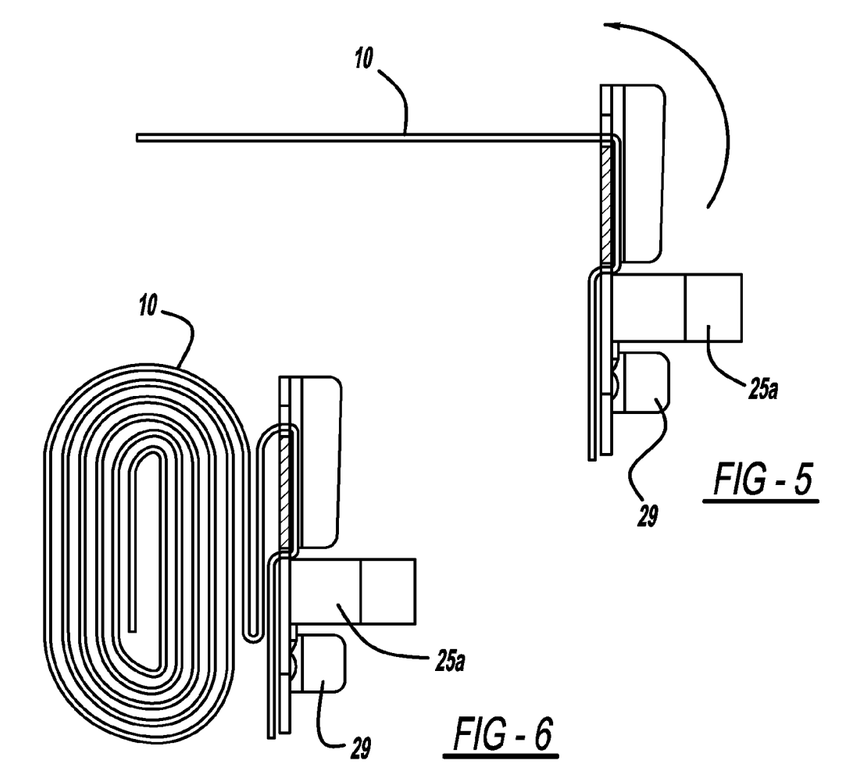
FIG. 5 is a longitudinal section taken along the line A-A of FIG. 4.
FIG. 6 is the same as in FIG. 5 with the airbag rolled up.

As shown in FIGS. 3 and 4, the airbag flap side sections 12a and 12b are placed into the pincer-shaped sections 22a and 22b and the fastening clip is wrapped around the connecting element 20 until the upper segment 12c of the fastening flap 12 becomes arranged behind the semicircular section 23 of the connecting element 20. The airbag 10 is then rolled up and may be covered with an outer covering 11. As clearly evident in FIG. 6, the locking sections 25a and 25b are located behind the rolled-up airbag 10, making a very compact arrangement.

Such a fastening technique for the airbag 10 onto the connecting element is especially suitable for an airbag module of the present invention because of the space-saving that is possible.

Figure 7:
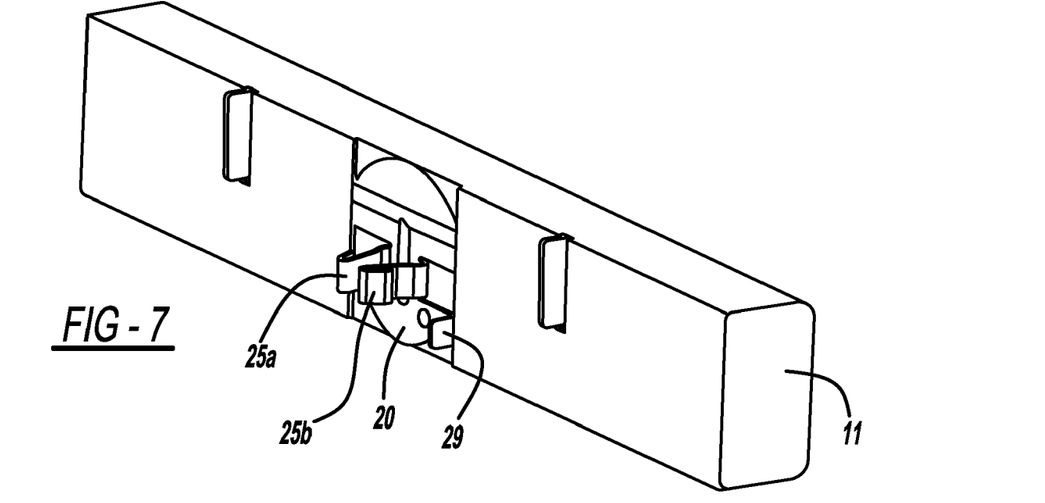
FIG. 7 shows an airbag covering with an outwardly-pointing locking section of a connecting element.

FIG. 7 shows an airbag 10, which is provided with an assembled connecting element 20 and is covered by a covering 11, wherein the locking sections 25a and 25b and the rotary-protection clip 29 protrude from an aperture in the covering.

In the next assembly step, the retention lever 30 is arranged on the connecting element 20. As already mentioned, the connecting element 20 and the retention lever 30 together form the fastening system of this invention.

Figures 8A, 8B:
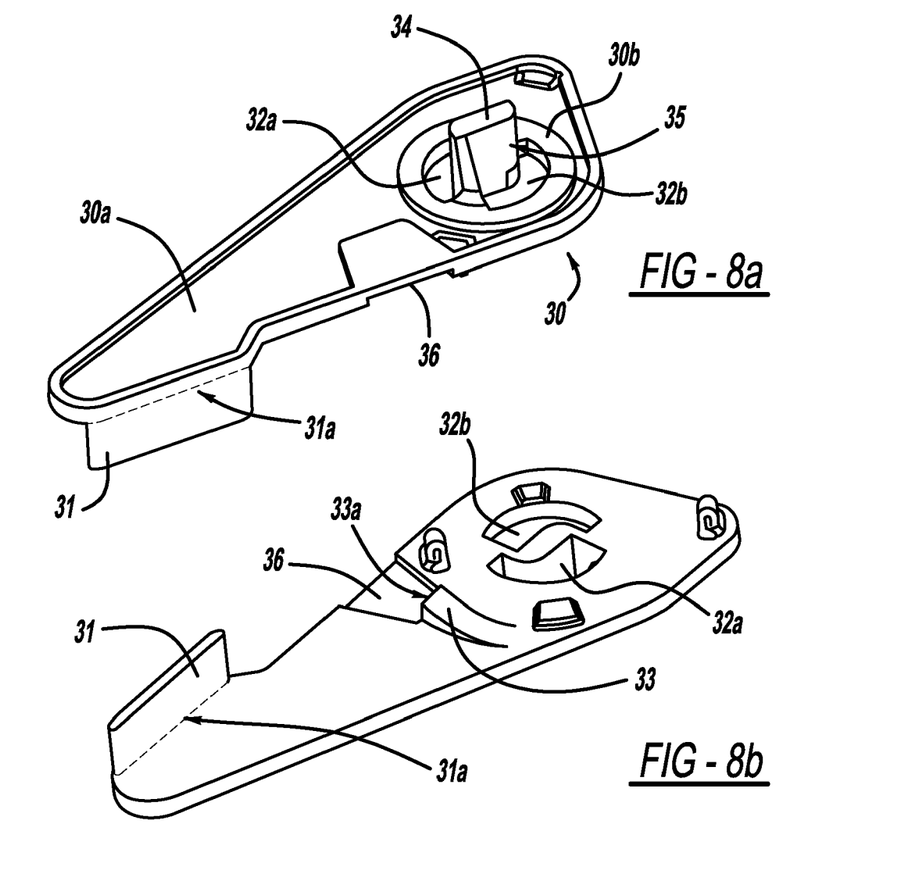
FIGS. 8a-d shows a retention lever in various views.
Figure 8C:
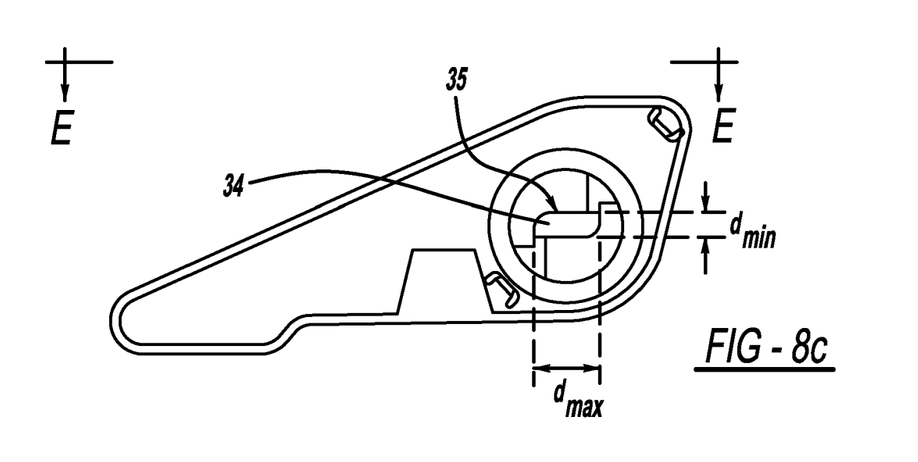
Figure 8D:
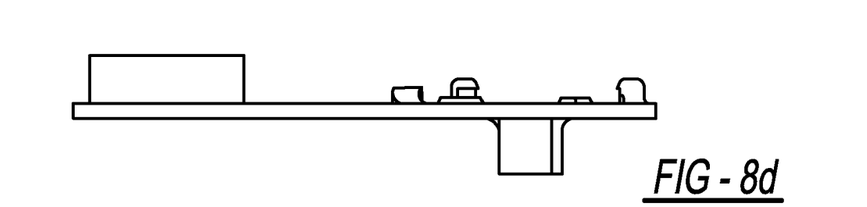

FIGS. 8a to d show different views of a retention lever 30. To this end, FIGS. 8a and 8b are perspective illustrations of two sides, FIG. 8c is a top view, and FIG. 8d shows the retention lever 30 in another top view along the line E-E of FIG. 8c.

The fastening system of the exemplary embodiments illustrated here is configured in such a manner that the retention lever 30 is held by the locking sections 25a and 25b and acts upon them when it swings into the retention position. This has various advantages. First, it enables the fastening system to have a minimum number of parts and, furthermore, it is not necessary to provide any additional apertures for the retention lever 30 in the vehicle interior structure.

Another advantage is that the retention lever 30 doesn't require any flexurally elastic parts and can therefore be produced out of plastic material without problem. The retention lever 30 includes a lever section 30a and an acting section 30b. A cap 34, comprising a surrounding contact surface 35 and two connecting-link slots 32a and 32b surrounding the cap 34 in sections, is disposed on the acting section 30b. The cap 34 of acting section 30b has an oblong cross section with maximum diameter $d_{max}$ and minimum diameter $d_{min}$. Moreover, the acting section 30b forms a ramp 33 which, in cooperation with the previously mentioned arm 24, serves for locking the retention lever 30 into its retention position. An indentation 36 is disposed in front of the ramp. A limit stop 31 is arranged on the lever section 30a above a break-off line 31a.

Figure 9:
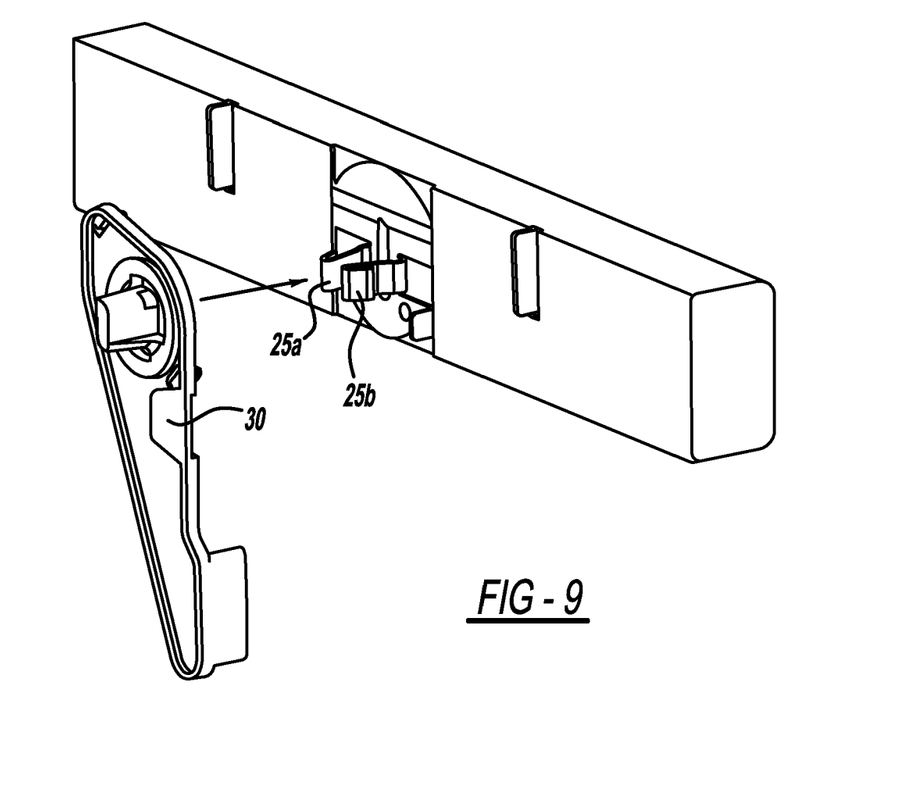
FIG. 9 shows the covered airbag shown in FIG. 7 with the connecting element and the retention lever shown in FIG. 8.
Figure 10:
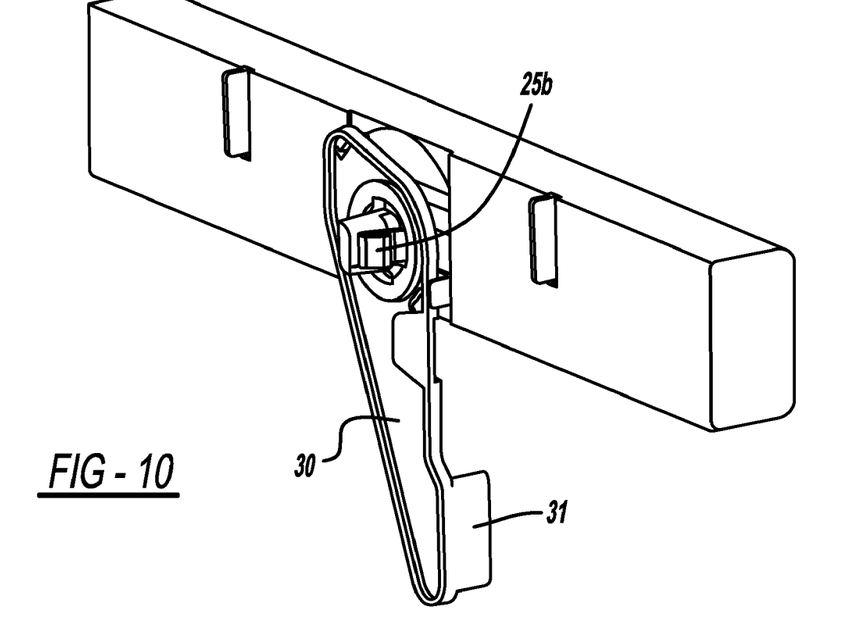
FIG. 10 is the same as in FIG. 9 with a retention lever arranged on the connecting element, wherein the retention lever is in the assembly position.

FIG. 9 shows how the retention lever 30 is mounted on the two locking sections 25a and 25b. FIG. 10 shows the assembled state, wherein the retention lever 30 is in its assembly position. The two locking sections 25a and 25b project through the connecting-link slots 32a and 32b, and upper regions of the first legs 26a and 26b become arranged on the contact surface 35 of the cap 34. The retention lever 30 is thereby held on the connecting element 20. In the assembly position, as shown in FIG. 11, the upper sections of the first legs 26a and 26b are arranged on the sections of the contact surface 35 that have a minimum clearance $d_{min}$ to one another.

Figure 11:
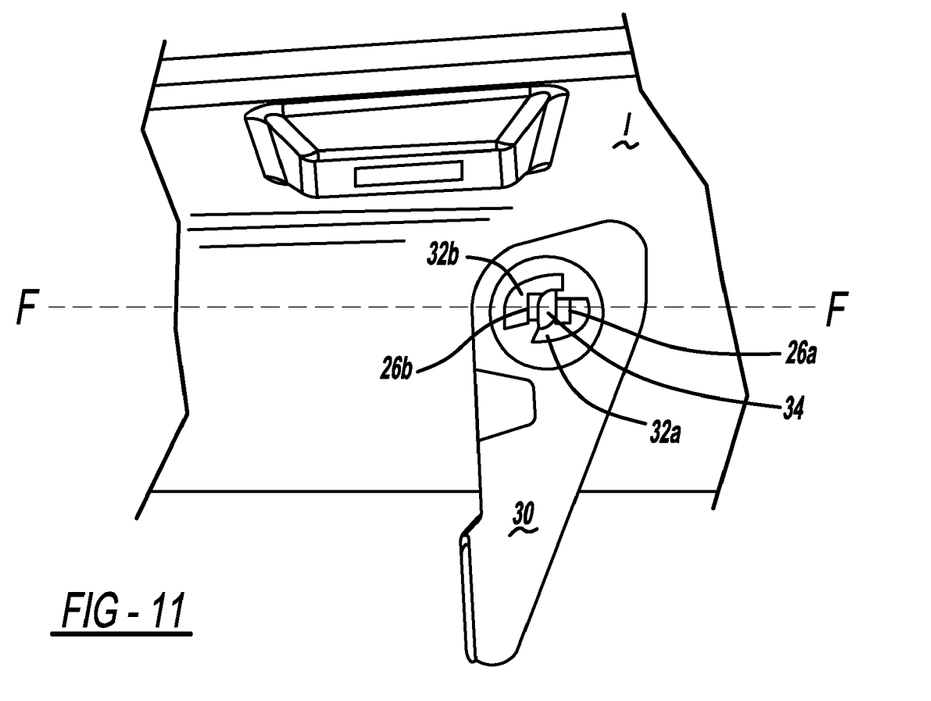
FIG. 11 shows a portion of the vehicle interior structure and a retention lever in the assembly position.
Figure 11A:
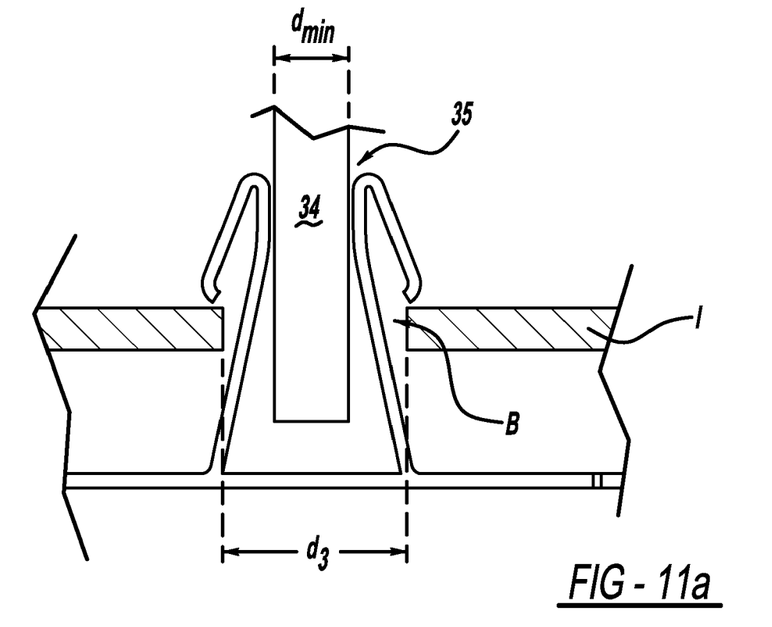
FIG. 11a is a longitudinal section taken along the line F-F of FIG. 11.

FIG. 11 shows how the fastening system is mounted on the interior structure I of a vehicle, wherein the retention lever 30 is in its assembly position. To this end, FIG. 11 shows a longitudinal section at the height of the connecting-link slots 32a and 32b, viewed from the interior of the car. The diameter $d_B$ of the aperture or boring B, which accommodates the locking sections 25a and 25b (see FIG. 11a) and is disposed in the vehicle interior structure, is chosen in such a manner that the two locking sections 25a and 25b can be inserted into the boring with slight deformation of the two legs 27a and 27b, so that the two legs 27a and 27b engage the boring when the retention lever 30 is in its assembly position. This is also illustrated in FIG. 11a, which is a longitudinal section through FIG. 11 along the line F-F.

Figure 12:
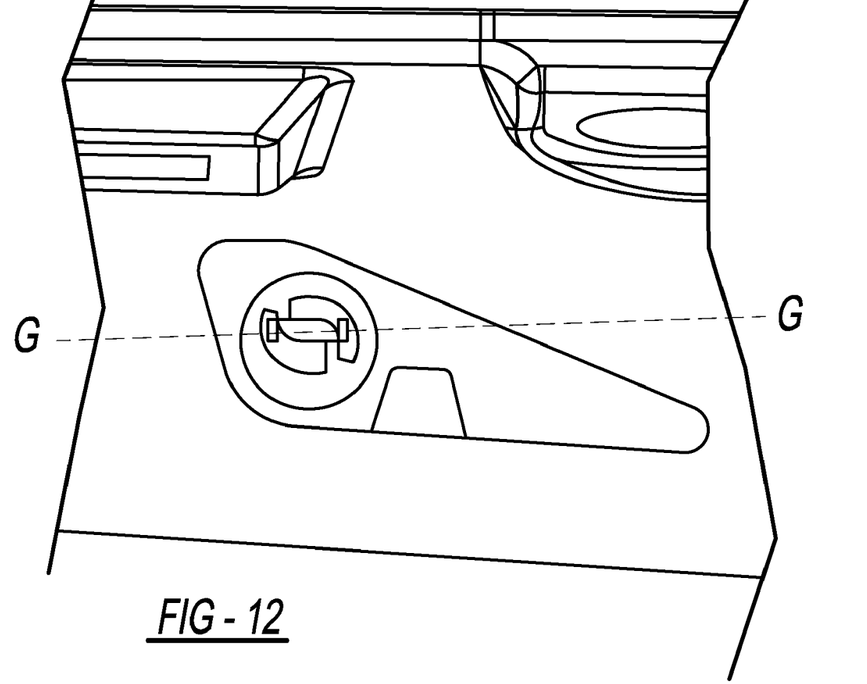
FIG. 12 is the same as in FIG. 11 with the retention lever in the retention position.
Figure 12A:
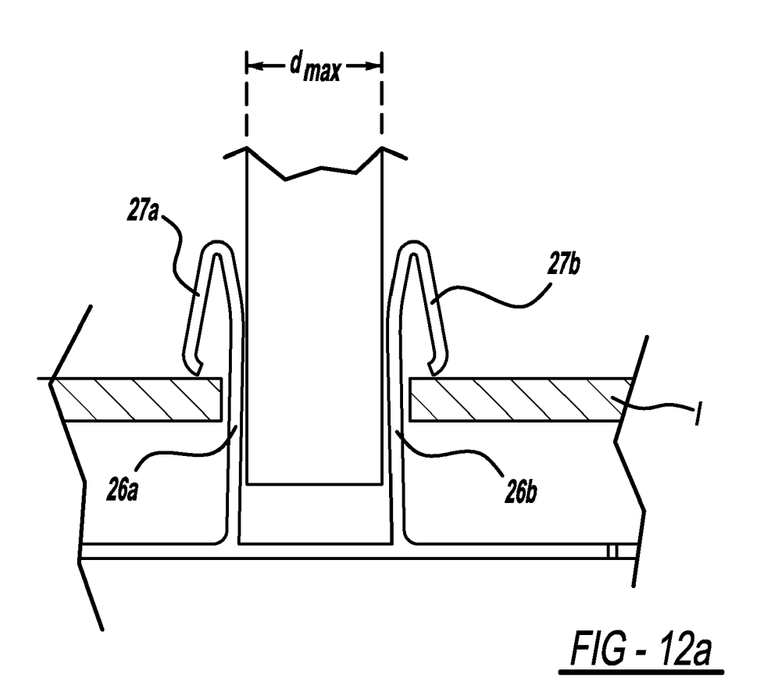
FIG. 12a is a longitudinal section taken along the line G-G of FIG. 12.

If the retention lever 30 now swings 90° from its assembly position into its retention position, as illustrated in FIG. 12, the first legs 26a and 26b are pressed outward from the contact surface 35 of the cap 34 and come into contact with the wall of the boring B. The fastening system is thereby fixedly mounted (see FIG. 12a in particular). In the retention position, the retention lever 30 disappears behind the folded and covered airbag 10, so that the interior trim panel can be attached in the immediately succeeding assembly step. The limit stop 31 is arranged to come into contact with the airbag covering 11 and is separated at the break-off line 31a when the airbag unfolds so that it is not in the way of the airbag's expansion.

In the assembly position, the retention lever 30 projects vertically underneath the airbag 10, as clearly visible in FIG. 10 for example, so that it would be in the way of assembling the interior trim panel. If, on the other hand, the retention lever 30 has already swung into its retention position before the two locking sections 25a and 25b have been inserted into the boring, then the two locking sections 25a and 25b are so far apart that insertion into the corresponding boring is prevented. One can therefore see that there exists an automatic quality control, namely to the effect that mounting the interior trim panel is only possible when the airbag module has been properly installed on the interior structure.

In the retention position, the front surface 33a of the ramp 33 is arranged on the arm 24 so that the retention lever 30 cannot swing back to the assembly position. If the curtain airbag needs to be disassembled, for repair for example, then, by putting a screwdriver or similar tool into the indentation 36 of the retention lever 30, it is possible to bend away the elastic arm 24 and lift it over the ramp 33 so that the retention lever is no longer interlocked and the retention lever 30 can be swung back into the assembly position.

Figure 13A:
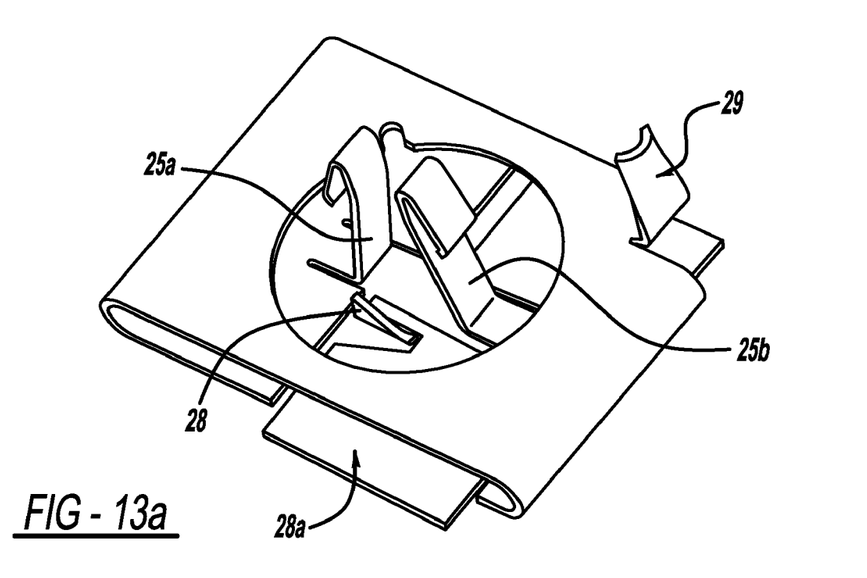
FIG. 13a-c shows various views of a second embodiment of a locking section of a connecting element in accordance with this invention.
Figure 13B:
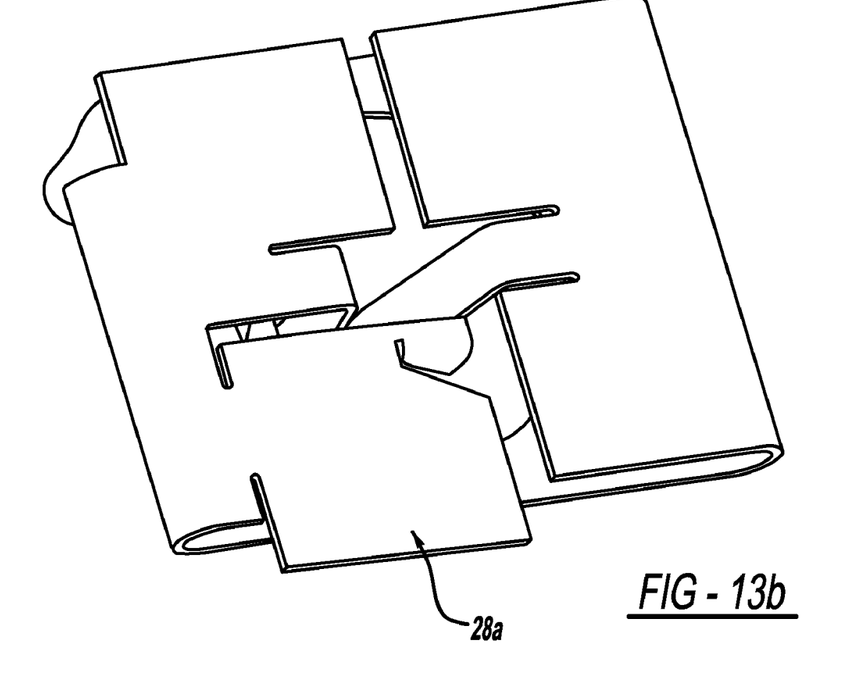
Figure 13C:
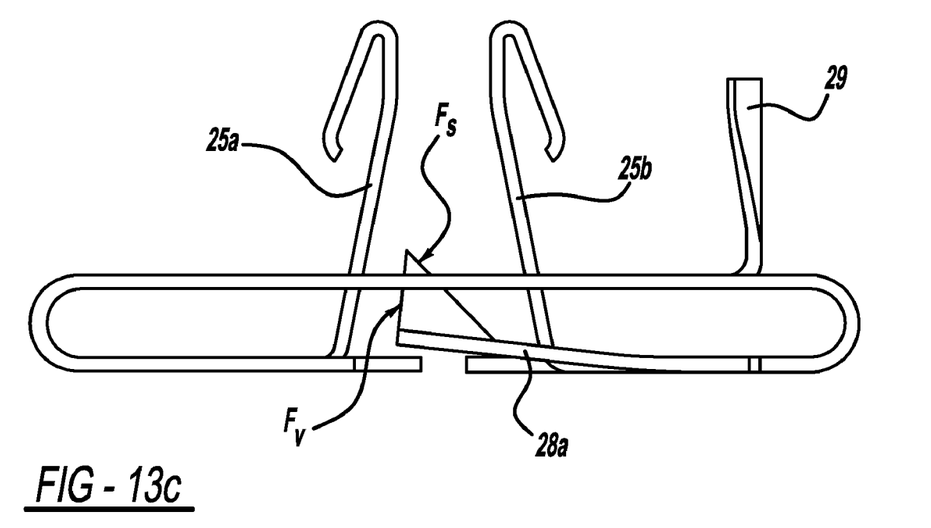
Figure 14:
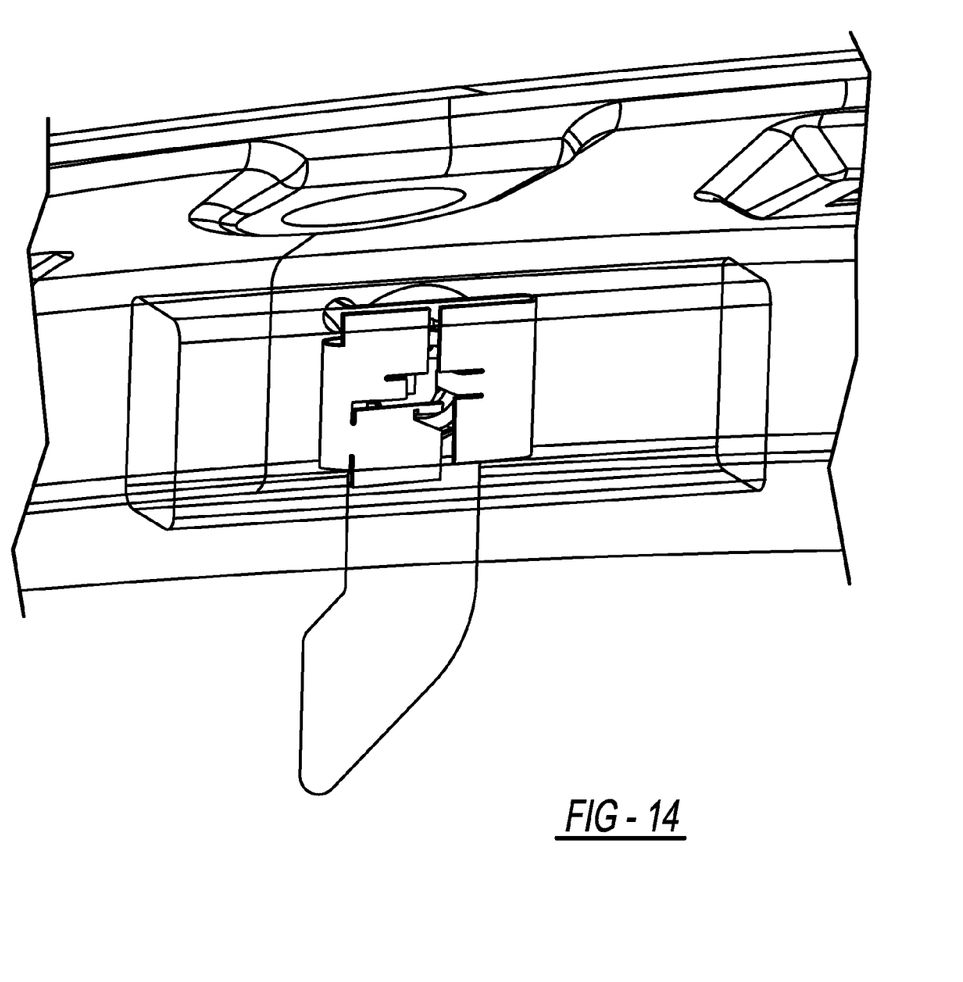
FIG. 14 shows a second embodiment of an airbag module on the interior structure of a vehicle in perspective illustration.

FIGS. 13a to 13c show a second exemplary embodiment of a connecting element 20 in which the retention lever is likewise locked in its retention position and this locking can be released. FIGS. 13a to 14 illustrate only that region of the connecting element 20 that contains the locking sections 25a and 25b; the fastening section for fastening the airbag is not illustrated.

Figure 15:
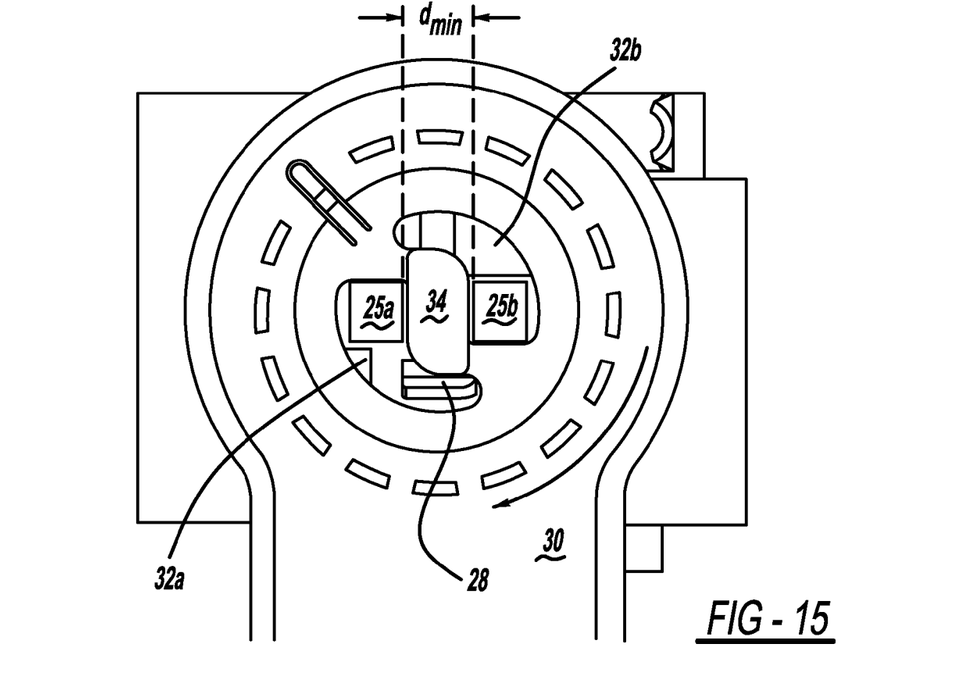
FIG. 15 is a cutout of a fastening unit with the retention lever in the assembly position.
Figure 16:
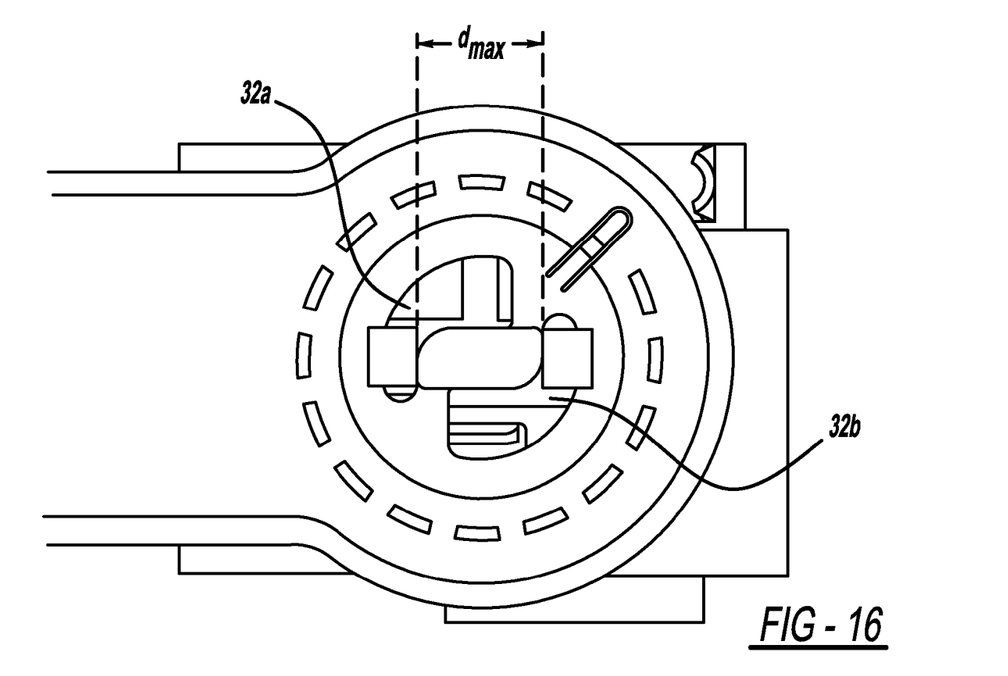
FIG. 16 is the same as in FIG. 15 with the retention lever in the retention position.

As can best be seen with reference to FIGS. 13a and 13c, the connecting element 20 includes a tongue 28, which forms a surface $F_s$ which extends diagonally and is pressed in the direction of the connecting-link slots 32a and 32b by a resilient section 28a. When the retention lever 30 is mounted (FIGS. 14-16), the tongue 28 extends through the first connecting-link slot 32a. If the retention lever 30 now swings into its retention position, applied force on the diagonally running surface $F_s$ presses the tongue 28 downwards, causing it to jump into the second connecting-link slot 32b when the retention position is reached. This is particularly evident in FIGS. 15 and 16. The surface $F_v$ of tongue 28, which extends essentially vertical, prevents the retention lever 30 from rotating back into the assembly position. If it is indeed necessary to disassemble the airbag module, then the tongue 28 can be pressed out of the second connecting-link slot 32b with the aid of a tool, and the locking can be raised so that the retention lever 30 can be swung into its assembly position and the airbag module can be disassembled.

While the above description constitutes the preferred embodiment of the present invention, it will be appreciated that the invention is susceptible to modification, variation and change without departing from the proper scope and fair meaning of the accompanying claims.

The invention claimed is:

1. An airbag module assembly with an airbag having a fastening system for fastening the airbag to the interior structure of a motor vehicle, the fastening system comprising a connecting element having a fastening section for fastening the airbag and at least one locking section for locking the connection element into an aperture in the interior structure, a retention element, which has an assembly position and a retention position and is arranged to attach to and move relative to the connecting element between the positions, wherein the connecting element is assembled to the interior structure only when the retention element is in the assembly position, and wherein the connecting element is locked to the interior structure when the retention element is in the retention position, and wherein the retention element is configured as a retention lever and is swivel-mounted on the connecting element as the retention lever moves between the positions.

2. An airbag module assembly according to claim 1, wherein the retention position lever is swiveled about 90° from the assembly position to the retention position.

3. An airbag module assembly according to claim 2, wherein the retention lever, when in the retention position, is located behind the airbag.

4. An airbag module assembly according to claim 1, wherein the retention lever, in the assembly position, acts upon the locking section.

5. An airbag module assembly according to claim 1, wherein at least two locking sections are present and the swivel axis of the retention lever is located between the two locking sections.

6. An airbag module assembly according to claim 5, wherein the locking sections are configured U-shaped, each having a first and a second leg, wherein the second legs have free ends, and wherein the retention lever acts upon the first legs to move the first legs between the assembly and retention positions.

7. An airbag module assembly according to claim 6, wherein the first legs are pressed outwardly by the retention lever when the retention lever swings into the retention position.

8. An airbag module assembly according to claim 7, wherein the retention lever includes link slots for receiving the first legs.

9. An airbag module assembly according to claim 1, wherein the retention lever, when in the retention position, locks onto the connecting element.

10. An airbag module assembly according to claim 9, wherein the locking is releasable.

11. An airbag module assembly according to claim 1, wherein the connecting element fastening section forms two sections configured pincer-shaped to engage the airbag.

12. An airbag module assembly according to claim 1, wherein the connecting element is formed of metal and the retention lever is formed of plastic.

13. An airbag module assembly according to claim 1, wherein the connecting element is of one-piece integral construction.

14. An airbag module assembly with an airbag and having a fastening system for fastening the airbag to the interior structure of a motor vehicle through engagement with an aperture formed within the interior structure, the fastening system comprising:
a connecting element having a fastening section for fastening and securing the airbag to the connecting element and a locking section for locking the connection element into the aperture in the interior structure, the locking section having a pair of legs engageable with the aperture; and
a retention lever arranged to attach to the connecting element and swivel relative to the connecting element between an assembly position and a retention position, the retention lever having a cap engageable with the legs, wherein the retention lever, when attached to the connecting element in the assembly position permits the locking section legs to engage with the aperture allowing the module assembly to be attached to the interior structure, and when the retention lever is moved to the retention position, the cap engages the locking section legs to force them outwardly into secure engagement with the aperture, the locking section legs cooperating with the aperture to prevent the locking section legs from being inserted into the aperture when the retention lever is in the retention position.

15. An airbag module assembly according to claim 14, wherein the retention lever is swiveled about 90° from the assembly position to the retention position.

16. An airbag module assembly according to claim 14, wherein the retention lever, when in the retention position, is located between the airbag and the interior structure forming the aperture.

17. An airbag module assembly according to claim 14, wherein the locking section legs are configured U-shaped, each having with a first and a second leg section, wherein the second leg sections have free ends, and wherein the retention lever cap acts upon the first leg sections.

18. An airbag module assembly according to claim 17, wherein the first leg sections are pressed outwardly by the retention lever cap when the retention lever swings into the retention position.

19. An airbag module assembly according to claim 17 wherein the retention lever forms a pair of slots with the cap therebetween which receive the locking section legs.

* * * * *

UNITED STATES PATENT AND TRADEMARK OFFICE
CERTIFICATE OF CORRECTION

| | | |
|---|---|---|
| PATENT NO. | : 7,694,999 B2 | Page 1 of 1 |
| APPLICATION NO. | : 11/631882 | |
| DATED | : April 13, 2010 | |
| INVENTOR(S) | : Thomas Siewiera et al. | |

It is certified that error appears in the above-identified patent and that said Letters Patent is hereby corrected as shown below:

In the Claims

In column 5, claim 2, line 63, after "wherein the retention" delete "position".

In column 6, claim 17, line 67, after "each having" delete "with".

Signed and Sealed this

Fourteenth Day of December, 2010

David J. Kappos
*Director of the United States Patent and Trademark Office*